Figure 1:
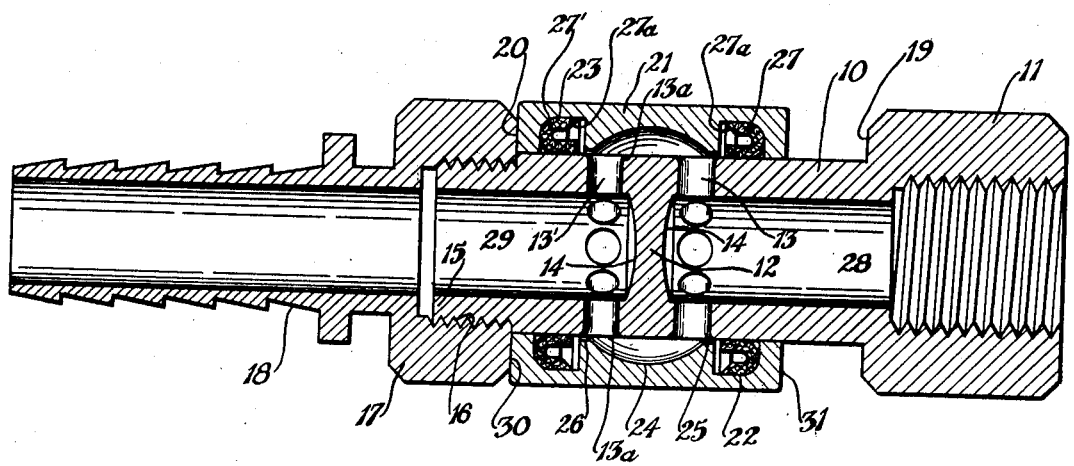

Jan. 23, 1934.                N. C. HUNT                1,944,739
                                VALVE
                     Original Filed April 25, 1930

INVENTOR
BY  Nathan C. Hunt
Frease and Bishop  ATTORNEYS

Patented Jan. 23, 1934

1,944,739

UNITED STATES PATENT OFFICE 1,944,739

VALVE

Nathan C. Hunt, Salem, Ohio

Original application April 25, 1930, Serial No. 447,309, now Patent No. 1,850,879, March 22, 1932. Divided and this application December 16, 1931, Serial No. 581,341, and in Germany April 16, 1931

4 Claims. (Cl. 251—8)

The invention relates to valves for pressure lines utilized in transferring air, water or other gaseous or fluid medium under pressure from place to place. Such air pressure lines include among others, those used for operating pneumatic tools, those used in connection with various operations in the rubber industry, those used in connection with various types of foundry equipment and those used in carrying out spray painting. Such water pressure lines include among others, various types of hose lines, sprinkling system lines and lines used by road and building contractors.

Numerous valves of the cock type have been made in the past for use in pressure lines, but cock type valves usually include a tapered valve body and a valve seat which must be very accurately fitted together, and which only properly function for a short time, after which leakage occurs in the pressure line at the valve. Such prior types of cock valves have, however, been provided with means for bleeding the exhausting side of the line in which the valve is connected.

It is therefore an object of the present invention to provide a valve for a pressure line which may be readily, quickly, easily and almost instantaneously operated to cut off the flow of fluid under pressure through a pipe line without having any leakage whatsoever at the valve, regardless of the pressure in the line, whether it be one ounce or one thousand pounds more or less; and this application is a division of my patent application for valve and coupling filed April 25, 1930, Serial No. 447,309, matured as Patent No. 1,850,879, dated March 22, 1932.

It is also an object of the present invention to provide such a valve with means for bleeding the exhausting end of the pressure line when the valve is in "off" position.

Moreover, it is an object of the present invention to provide sealing means for such a valve which is directly acted upon by the pressure in the line to increase its sealing capacity or effectiveness when the pressure in the line is increased, regardless of whether the valve is in "on" or "off" position.

Moreover, it is an object of the present invention to provide a valve wherein the pressure in the line in which the valve is located acts to hold the valve in the position at which it is set, regardless of whether the valve is in "on" or "off" position.

A further object of the present invention is to provide a valve of the sleeve type which may be operated by the most inexperienced person from "on" to "off" position substantially instantaneously either by a rotary or a longitudinal movement of the valve sleeve.

Moreover, it is an object of the present invention to provide a valve of the sleeve type in which the valve packing is substantially free from wear or destruction by continued operation of the valve.

And finally, it is an object of the present invention to provide a valve construction of the character described in which the constituent parts are of an extremely simple design, are cheap and easy to manufacture, and are very efficient in use.

These and other objects may be obtained by providing a construction, preferred embodiments of which are hereinafter set forth in detail, which may be stated in general terms as including a bypass valve body, a valve sleeve, packing means interposed between the valve body and valve sleeve, and the by-pass portion of the valve body being preferably arranged so as to bleed the exhausting side of the valve when the valve is in "off" position.

Figure 2:
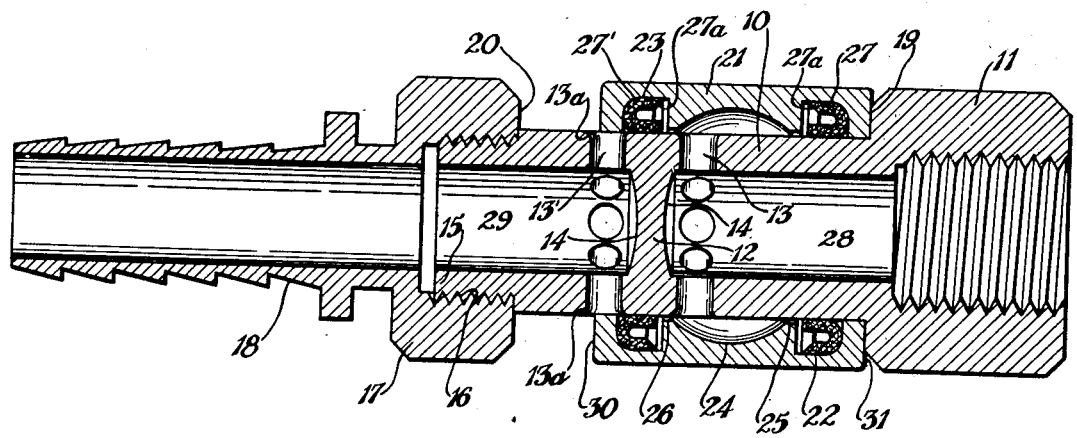

A preferred form of the improved valve is shown in the accompanying drawing forming part hereof in which Figure 1 is an enlarged longitudinal section through a valve of the improved type, the valve sleeve being shown in "on" position; and Fig. 2 is an enlarged longitudinal section similar to Fig. 1 showing the valve in "off" position.

Similar numerals refer to corresponding parts throughout the various figures of the drawing.

The improved valve is shown in Fig. 1 in "on" position, and includes the valve body 10 provided with preferably an integral internally threaded pipe connection adapter member 11. The valve body 10 is preferably cylindrically tubular in shape, having preferably an integral transverse dividing wall or partition disk 12 formed intermediate its ends for interrupting the flow of any fluid medium therethrough.

The tubular walls of the valve body 10 are provided with a plurality of similar by-pass openings or ports 13 and 13', preferably arranged radially of the tubular valve body 10, adjacent each side face 14 of the disk 12.

One end 15 of the valve body 10 is preferably threaded at 16 for connection with the internally threaded portion 17 of a hose connection adapter member 18.

It is pointed out that any form of pipe or hose connection adapter member may be provided in order to meet the particular circumstances of the pressure line in which the valve is to be located, that is say, the hose connection adapter member 18 and the pipe connection adapter 11 may be transposed so that the member 18 is on the right hand end of the valve body 10 and so that the member 11 is on the left hand end of the valve body 10. Likewise, both members 11 and 18 may be either hose connection adapter members or pipe connection adapter members, or any other form of connection adapter members required for use.

The only restriction upon the selection of and arrangement of connection adapter members resides in the fact that the annular face 19 of the member 11, and annular face 20 of the member 18 must always be located at a predetermined distance with reference to the disk 12 and by-pass ports 13 and 13' for a purpose which will hereinafter be described.

The valve sleeve 21 is preferably slidably and rotatably mounted on the tubular valve body 10 and is provided preferably with two internal circumferential grooves 22 and 23 adjacent its end portions, there being a rounded internal circumferential groove 24 interposed between the grooves 22 and 23.

When the sleeve 21 is mounted on the valve body 10, sufficient clearance is provided at 25 and 26 for forming a communication between the groove 24 and the grooves 22 and 23, respectively, for a purpose which will hereinafter be described.

Flexible U-shaped channel packing rings 27 and 27' preferably formed of leather, are interposed between the valve body 10 and valve sleeve 21 and are located in the circumferential grooves 22 and 23 with the open side of the U-shaped channel of one packing ring 27 directed toward the open side of the U-shaped channel of the other packing ring 27'. It is pointed out that the outer annular edge of each packing ring 27 and 27' is bevelled at 27a in order to permit the body of leather to properly position and seat itself within the groove 22 or 23 without wrinkling.

The valve is shown in "on" position in Fig. 1, wherein the right hand side pressure compartment bore 28 of the valve body 10 is the pressure line side, while the left hand exhaust compartment bore 29 of the valve body 10 is the exhaust line side. When the valve is connected in a pressure line, fluid under pressure enters the cylindrical bore 28 through the adapter connection 11, thence flows through the by-pass ports 13, along the chamber formed by the internal annular groove 24 of the valve sleeve 21, through the by-pass ports 13' and into the tubular bore 29, and thence out through the adapter member 18.

The full line pressure being present in the chamber formed by the groove 24 acts through the communications 25 and 26 upon the U-shaped leather packing rings 27 and 27' regardless of the position of the sleeve 21 to force the inner circumferential surface of the packing rings tightly in sealing relation against the outer peripheral surface of the valve body 10. Thus, as the pressure in the line increases, the effectiveness of the seals 27 and 27' also increases, so as to positively prevent any leakage at the valve.

The action of the line pressure on the U-shaped packing rings also functions to hold the valve sleeve at the position in which it is placed, because of the pressure of the inner surfaces of the U-shaped packing rings against the valve body 10. Accordingly, the valve is unaffected by vibration and jarring, or by any accidental blow from some external force not intended for changing the position of the valve sleeve.

The annular face 20 of the connection adapter member 18 provides a stop or abutment for the left hand end face 30 of the valve sleeve 21 when it is desired to position the valve sleeve in "on" position as shown in Fig. 1, so that the fluid in the pressure line in which the valve is interposed may be by-passed through the ports 13 and 13' and along the passage formed by the groove 24.

It is only necessary to slide or rotate a valve sleeve 21 longitudinally of the valve body 10 so that the other end face 31 of the valve sleeve 21 abuts against the end face 19 of the member 11 in order to position the valve in "off" position, as shown in Fig. 2, so that communication between the ports 13 and 13' is cut off.

As shown in Figs. 1 and 2, the outer peripheral edges of the ports 13 and 13' are formed or burnished to be rounded or curved at 13a in order to remove sharp edges which would cut into and destroy the leather packing rings 27' as the sleeve 21 slides to and fro along the valve body, when shifting the valve from "on" to "off" position or vice versa, when the packing ring 27' is under full line pressure.

When the valve is in "off" position as shown in Fig. 2, the exhaust side by-pass ports or openings 13' are uncovered by the sleeve and open to the atmosphere, so that the exhaust side by-pass openings 13' provide means for permitting fluid medium in the exhaust side of the line to escape to the atmosphere through the ports 13' termed herein as "bleeding the exhaust side of the valve".

When the valve is moved to "off" position, the packing ring 27 slides along the valve body, across the ports 13', and is positioned around the periphery of the valve body adjacent the partition wall 12 and between the ports 13 and 13'. Communication between the ports 13 and 13' is thus cut off, while full line pressure is exerted against the packing rings 27 and 27' through the ports 13 to seat the packing rings and prevent leakage of the valve when the same is in "off" position.

I claim:—

1. A valve including a tubular valve body having a transverse partition wall forming pressure and exhaust side compartments therein, there being ports in the tubular wall leading from each compartment, a sleeve mounted for movement on the valve body, there being an internal groove in said sleeve always communicating with said pressure side ports and establishing communication between all of said ports when the sleeve is in "on" position, two flexible channel-shaped packing rings carried by the sleeve interposed between the valve body and sleeve, the open sides of the channel-shaped rings being directed toward each other and always communicating through said sleeve groove with the pressure side ports, one of said packing rings moving across said exhaust side ports when the sleeve is moved to an "off" position, the outer edges of said ports being provided with rounded corners whereby said corners do not cut or destroy said packing ring movable thereacross, and said exhaust side ports being uncovered when the sleeve is in an "off" position providing means for bleeding the exhaust side of the valve.

2. A valve including a tubular valve body having a transverse partition wall forming pressure and exhaust side compartments therein, there being ports in the tubular wall leading from each compartment, a sleeve mounted for movement on the valve body, there being an internal groove in said sleeve always communicating with said pressure side ports and establishing communication between all of said ports when the sleeve is in "on" position, two flexible channel-shaped packing rings carried by the sleeve interposed between the valve body and sleeve, the open sides of the channel-shaped rings being directed toward each other and always communicating through said sleeve groove with the pressure side ports, and said exhaust side ports being uncovered when the sleeve is in an "off" position providing means for bleeding the exhaust side of the valve.

3. A valve including a tubular valve body having a transverse partition wall forming pressure and exhaust side compartments therein, there being ports in the tubular wall leading from each compartment, a sleeve mounted for movement on the valve body, there being an internal groove in said sleeve always communicating with said pressure side ports and establishing communication between all of said ports when the sleeve is in "on" position, two flexible channel-shaped packing rings carried by the sleeve interposed between the valve body and sleeve, the open sides of the channel-shaped rings being directed toward each other and always communicating through said sleeve groove with the pressure side ports, one of said packing rings moving across said exhaust side ports when the sleeve is moved to an "off" position, and the outer edges of said ports being provided with rounded corners whereby said corners do not cut or destroy said packing ring movable thereacross.

4. A valve including a tubular valve body having a transverse partition wall forming pressure and exhaust side compartments therein, there being ports in the tubular wall leading from each compartment, a sleeve mounted for movement on the valve body, there being an internal groove in said sleeve always communicating with said pressure side ports and establishing communication between all of said ports when the sleeve is in "on" position, two packing rings carried by the sleeve interposed between the valve body and sleeve, one of said packing rings moving across said exhaust side ports when the sleeve is moved to an "off" position, the outer edges of said ports being provided with rounded corners whereby said corners do not cut or destroy said packing ring movable thereacross, and said exhaust side ports being uncovered when the sleeve is in an "off" position providing means for bleeding the exhaust side of the valve.

NATHAN C. HUNT.